United States Patent [19]

Huntley, Jr.

[11] 3,738,753

[45] June 12, 1973

[54] INTERFEROMETER UTILIZING GRATINGS TO MEASURE MOTION

[75] Inventor: Wright H. Huntley, Jr., Los Altos, Calif.

[73] Assignee: Holograf Corporation, Los Altos, Calif.

[22] Filed: Sept. 21, 1970

[21] Appl. No.: 73,791

[52] U.S. Cl.............. 356/111, 356/167, 250/237 G
[51] Int. Cl........................ G01b 9/02, G01b 11/04
[58] Field of Search ................ 356/106, 111, 169, 356/170; 250/237 G

[56] References Cited
UNITED STATES PATENTS

| 3,482,107 | 12/1969 | Hock | 356/169 |
| 3,351,768 | 11/1967 | Cooke | 356/169 |
| 3,507,564 | 4/1970 | Franks | 356/106 |

Primary Examiner—Ronald L. Wibert
Assistant Examiner—Conrad Clark
Attorney—Limbach, Limbach & Sutton

[57] ABSTRACT

An interferometer and method of making same are disclosed wherein two energetic beams are used to record an interference pattern to form a grating having a period of a substantially exact multiple or standard submultiple of a standard measuring unit and wherein this interference pattern is utilized in an interferometer fringe counter wherein relative movement of the grating and source produce a fringe count which is a measure of the relative movement. The grating is disclosed as a hologram, and in one embodiment light is transmitted through the hologram in one direction and then back through the hologram in another direction whereby the interference fringes are established on the same side of the hologram as the source. In another embodiment two holograms are utilized, one fixed and one movable relative to the source, and interference fringes are established on the side of the hologram opposite the side where the source is located.

7 Claims, 13 Drawing Figures

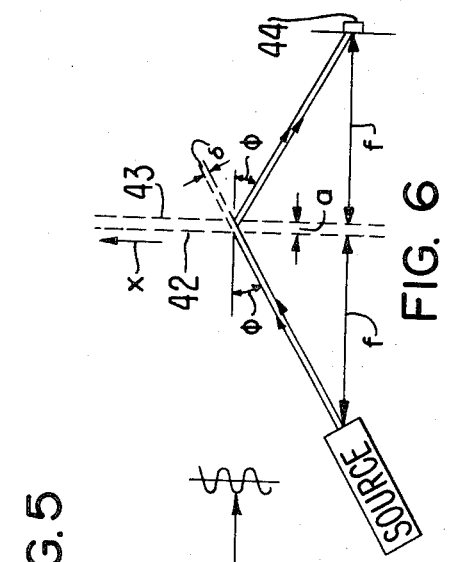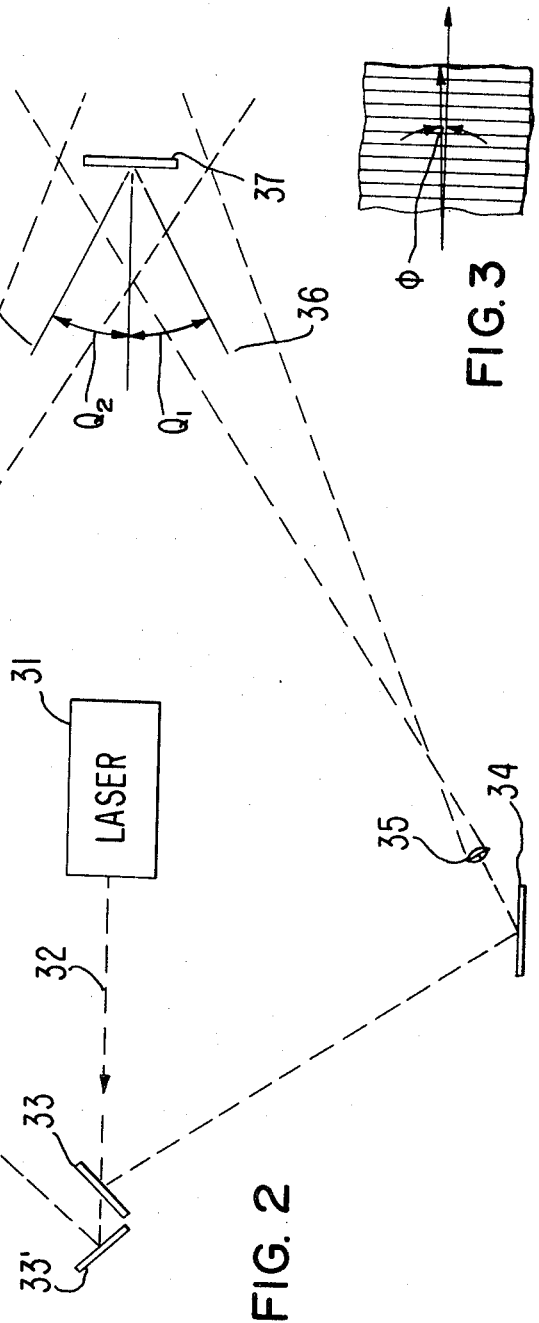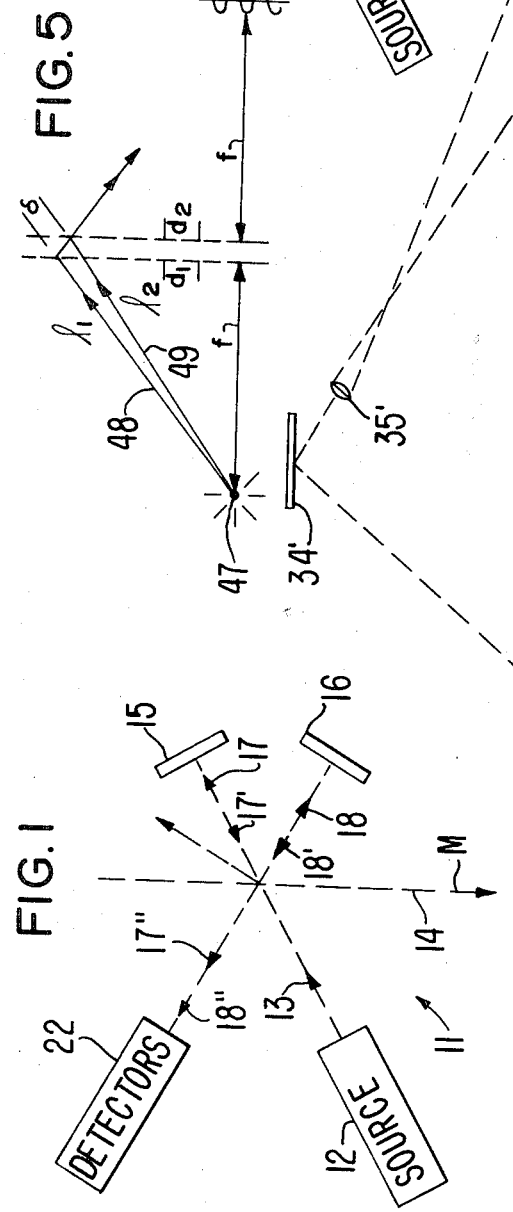

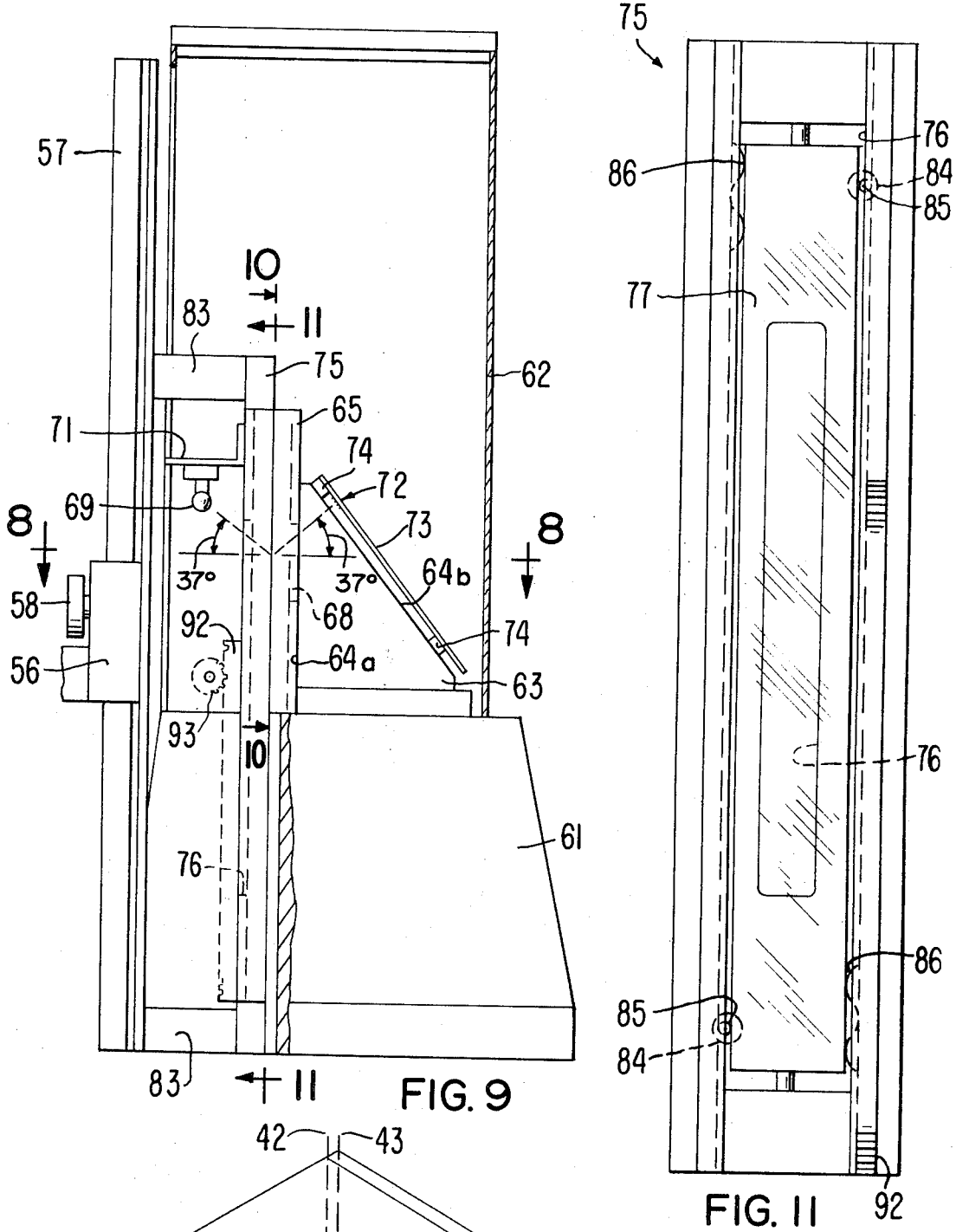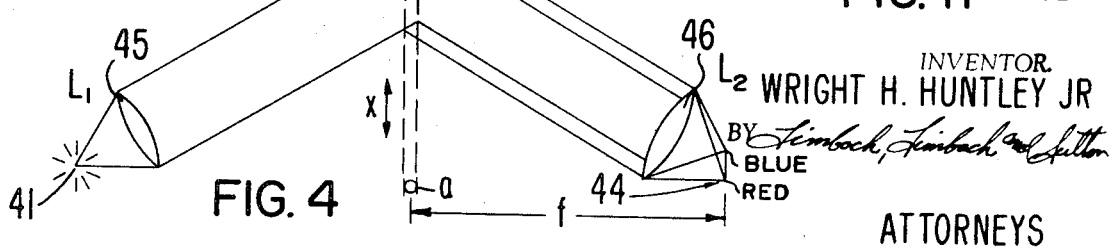

INVENTOR.
WRIGHT H. HUNTLEY JR.
ATTORNEYS

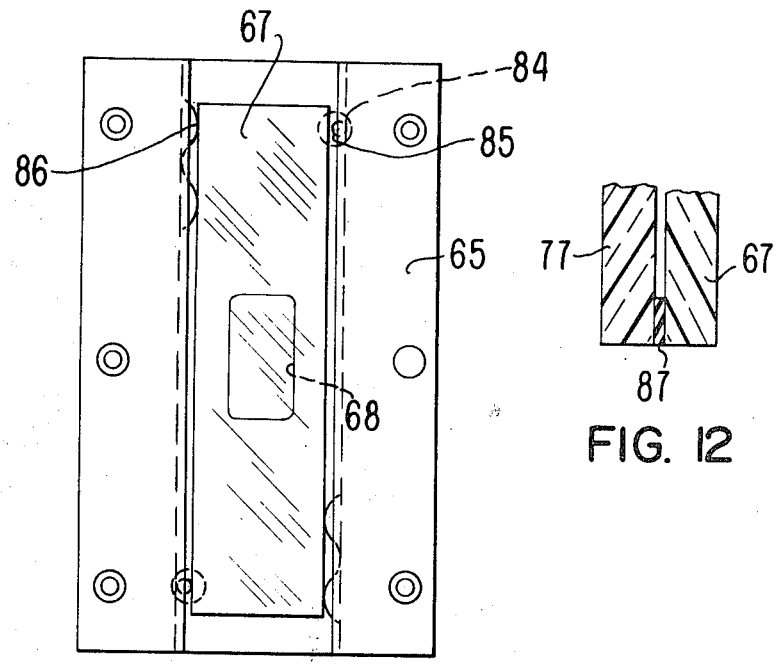
FIG. 10
FIG. 12
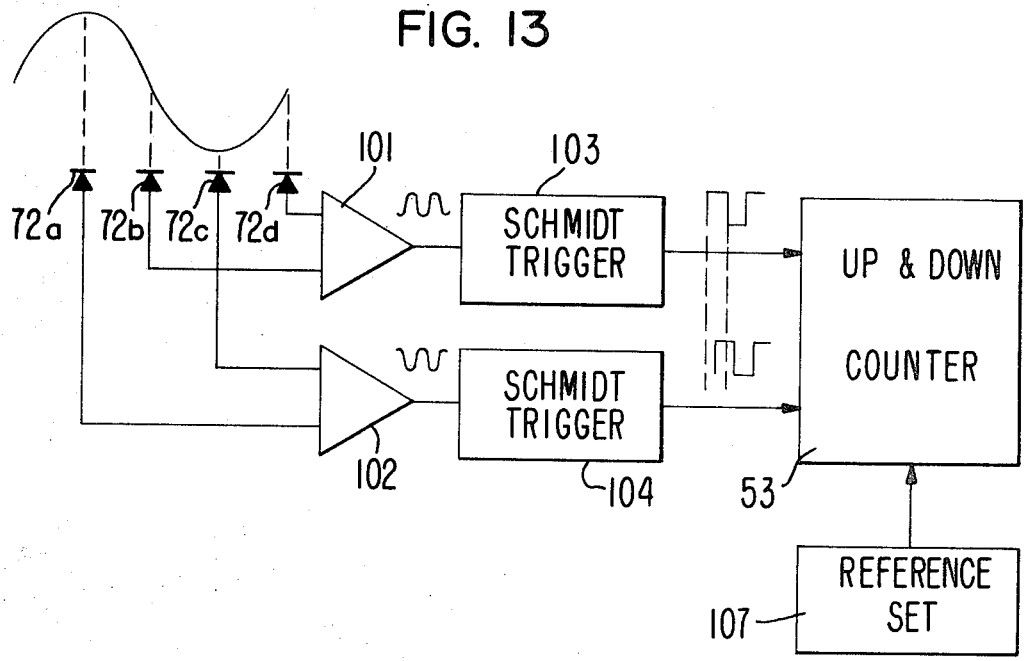
FIG. 13

INTERFEROMETER UTILIZING GRATINGS TO MEASURE MOTION

The present invention relates in general to an interferometer and method of making same and more particularly to a hologram interferometric fringe counter.

It is possible today in an interferometric fringe counter to measure easily the length of an object or movement of a machine with an accuracy of 10 microinches. The Helium-Neon laser has brought great improvement to such measurements, both in the metrology laboratory and in the shop.

In an interferometric fringe counter two or more light beams are made to follow different paths through an optical system and light is then combined so that interference can be observed. Relative movement of certain elements in the optical system causing a relative phase shift between the beams will result in a shift in the interference pattern which can be measured by counting fringes moved past a reference point as an indication of the relative movement in the system. Due to their coherence and frequency stability the use of lasers in interferometric fringe counters has greatly reduced the problems attendant to these instruments.

Laser interferometric fringe counters are, however, delicate and very expensive. The accuracy of these interferometers is primarily limited by change in laser gas pressure with age. This pressure change can alter the wavelength of the emitted light by as much as five parts in $10^7$ over the useful life of the laser. Presently laser lifetimes are a few hundred, at most a few thousand, hours. A secondary source of error is variation in the index of refraction of the medium, typically air, in which the interferometer operates. The index varies with temperature and pressure and measurements made over long paths must be corrected by taking thermometer and barometer readings and calculating the appropriate correction factor. Assuming reasonable path length and normal shop conditions, the correction can be as much as one part in $10^5$.

Besides the necessity for correction due to environmental changes interferometric fringe counters, to be useful, must provide their output information as an indication of movement in standard measuring units. Consequently, very sophisticated electronic computers have been developed to convert the 24.91 microinch wave length of the Helium-Neon laser to integral 10 microinch counts on a display. This computer usually has provision for either automatic or manual insertion of the atmosphere correction factors. Thus this computer simplifies the reading of length, but does so at the cost of thousands of dollars.

The object of the present invention is to provide an improved interferometric fringe counter and method of making same.

Broadly stated, the present invention, to be described in greater detail below, is directed to a hologram interferometric fringe counter including an energetic source, a grating for the energy of the source having a period which is a substantially exact multiple or standard submultiple of a standard measuring unit, means for providing interference fringes from source energy directed onto the grating, means providing relative movement of the source and the grating in parallel planes in directions substantially perpendicular to the lines of the grating, and means for determining changes in the interference fringes as a measure of the relative movement.

In accordance with a principal aspect of this invention the grating is in the form of a hologram formed by directing the energy from at least a pair of energetic beams onto a recording medium at the appropriate angle of inclination so that the period of the interference pattern of the grating is a substantially exact multiple or submultiple of a standard measuring unit.

With this construction the reading of the interferometric fringe counter can be presented in standard measuring units without the necessity for a complex conversion.

In accordance with another aspect of this invention the holographic record such as made on a stable base using a coherent laser is utilized to establish the interference fringes for counting with movement. The properties of the hologram reduce the coherent requirements of the light source. An inexpensive reliable solid state light source can be used rather than the laser source used in other interferometers and a flashlight bulb can work in certain configurations.

By constructing the grating with radiative interference instead of by other conventional techniques such as ruling, scribing or drawing, a grating produced in accordance with the present invention closely approaches a true sinusoidal condition as contrasted with a conventional square wave condition used in moire fringe counting systems.

By forming the grating in accordance with the present invention using monochromatic light in the two beams such as by reflecting light from a single coherent light source, the sinusoidal fringes are established and then the grating produced in this manner can be used in an interferometer using white light and Bragg diffraction.

In accordance with another aspect of the present invention, a Fourier transform hologram formed from the interference pattern of two energetic beams is provided in an assembly with an energetic source from which energy is directed onto the hologram. Means are provided for establishing interference fringes from a source of energy directed onto the hologram and relative movement is established between the source and the hologram in parallel planes in a direction substantially perpendicular to the lines of the interference pattern. The fringes are detected and counted as a measure of the movement. This aspect of the present invention can be accomplished with several constructions.

In one embodiment of the invention, the source and detector are located on the same side of the hologram. For establishing the interference beam, means are provided for directing energy in the zero order mode passed by the hologram back to and through the hologram and means for directing energy in the first order mode passed by the hologram back to and through the hologram whereby interference fringes are formed by energy in the zero and first order modes, redirected to and again passed through the hologram. This construction provides a good interferometer fringe counter when utilizing a coherent source of light. With appropriate retrodirective reflectors and/or added dispersive elements such as a prism or another grating to compensate for dispersion of the hologram grating, a noncoherent source can be used.

In accordance with another aspect of the present invention, a pair of hologram gratings can be used in a hologram interferometer fringe counter with a noncoherent source. An interferometer fringe counter in accordance with this aspect of the present invention includes a pair of Fourier-transfer holograms formed from the interference pattern of two laser beams, mounted with their lines substantially aligned, a light source positioned on one side of the holograms, and detectors for detecting changes in light intensity mounted on the other side of the hologram. One of the holograms is fixed with respect to the source and the detectors, and movement of the other hologram with respect to the one hologram, the source and the detector will result in fringe counts by the detector as a measure of the relative movement.

The interferometer fringe counter thus constructed with this invention avoids the problems of accounting for temperature and pressure changes in the source as well as the necessity for an expensive coherent source.

While selection of the appropriate incidence angle of light in formation of the hologram can result in the production of a grating with a period of the desired length for measurements in standard units, ease of manufacture can be achieved by providing a slight angle between the effective direction of motion of the hologram and the normal to the lines of the grating and adjusting this angle to make the final adjustment of grating period. This feature of the present invention enables greater tolerances in the original formation of the hologram.

Although the foregoing invention has been described in some detail by way of illustration and example for purposes of clarity of understanding, it is understood that certain changes and modifications may be practiced within the spirit of the invention as limited only by the scope of the appended claims.

In the drawings:

FIG. 1 is a plan schematic view of a ray tracing diagram schematically illustrating one embodiment of the present invention.

FIG. 2 is a plan view of a ray tracing diagram schematically illustrating the operation of one aspect of the present invention for forming a grating with an interference pattern of appropriate period.

FIG. 3 is an elevational view showing a portion of a grating and the manner of mounting same.

FIG. 4 is a schematic plan view of a ray tracing in a hologram interferometric fringe counter in accordance with another embodiment of the present invention.

FIG. 5 is a schematic plan view of a ray tracing in a hologram interferometric fringe counter utilizing collimated light.

FIG. 6 is a schematic plan view of a ray tracing in a hologram interferometric fringe counter using light from a point light source.

FIG. 9 is an elevational view of the structure shown in FIG. 7 with the cover and portion of the base partially broken away.

FIG. 10 is an elevational view of a portion of the structure shown in FIG. 9 taken along line 10—10 in the direction of the arrows.

FIG. 11 is an elevational view of a portion of the structure shown in FIG. 9 taking along line 11—11 in the direction of the arrows.

FIG. 12 is a portion of the structure shown in FIG. 8 delineated by line 12—12.

FIG. 13 is a schematic circuit diagram showing the relative position and operation of detectors shown in FIG. 9.

Figure 7:
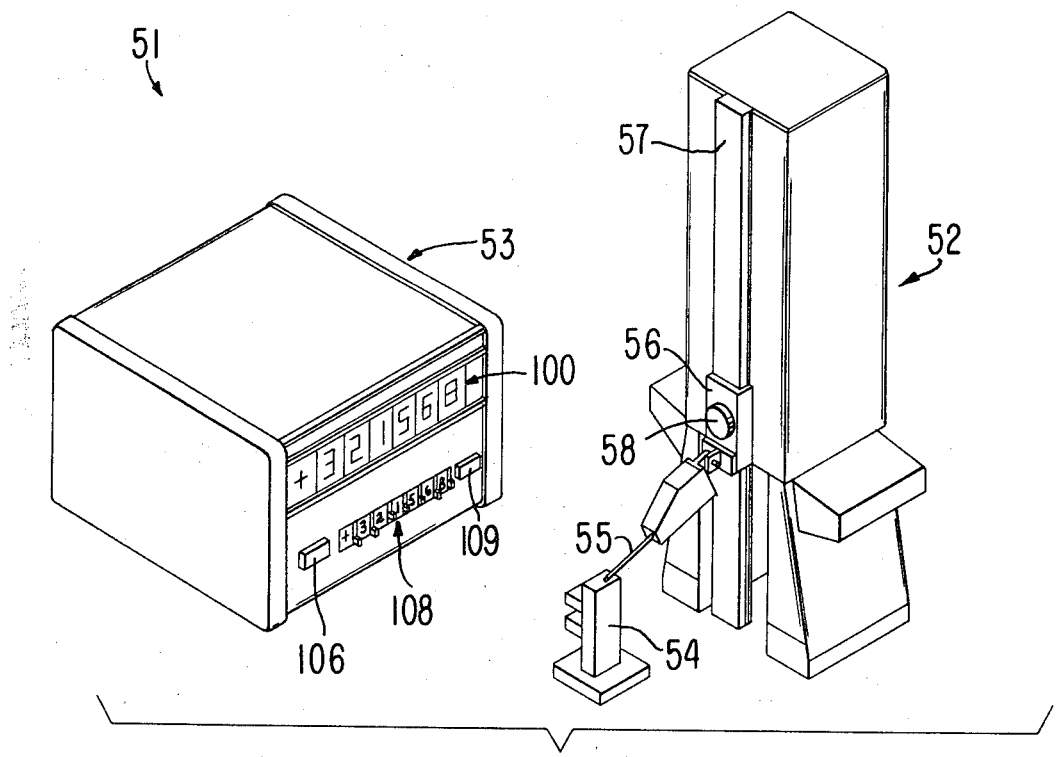
FIG. 7 is a perspective view of a hologram interferometric fringe counter in accordance with another embodiment of the present invention.

While the present invention can be construed and performed utilizing different energies such as electromagnetic energy or acoustic energy, it is ideally suited for provision of a hologram interferometric fringe counter formed from and utilizing light beams, and for purposes of illustration will be described with respect thereto.

Referring now to the drawings with particular reference to FIG. 1, there is shown one form of interferometer 11 formed in accordance with the present invention. The interferometer includes an energetic source 12 such as a helium-neon gas laser directing a beam 13 onto a grating 14. In this invention the grating is in the form of a hologram and can be produced in the manner described below with reference to FIG. 2. A pair of plane mirrors or retroreflectors 15 and 16 are positioned on the opposite side of the hologram 14 from the source 12 for reflecting the zero order and first order diffraction waves 17 and 18, respectively, as waves 17' and 18', respectively, back to and through the hologram 14. On passing through the hologram the second time, the reflected zero order wave 17' diffracts some of its energy into a first order wave 17" toward a pair of detectors 19 spaced apart in the direction of motion of the fringes upon movement of the hologram as described below for obtaining signals in quadrature. Some of the energy of the original first order wave 18 redirected as wave 18' to the hologram 14 passes directly through the hologram 14 as wave 18" to detectors 22. Waves 17" and 18" form an interference fringe pattern at the detectors 22, and with relative movement of elements of the interferometer, the fringe pattern is shifted. By counting the fringes as the pattern is shifted, a measure of the relative motion is achieved.

The source 12, mirrors 15 and 16, and detectors 19 are fixed with respect to one another but hologram 14 positioned on a movable carriage (not shown) is movable with respect thereto in a direction indicated by arrow M in the plane of the hologram 14 substantially perpendicular to the lines of the interference pattern thereof. This relative motion yields at the detectors two fringe shift counts per grating period since phase shifts are reversed for waves 17" and 18". Thus, in an interferometer in accordance with the present invention, 50,000 line per inch grating gives one count every 10 microinches.

50,000 line gratings cannot be made economically by conventional ruling engines but can be formed utilizing holography as described below. Once a master hologram is made, coherent replication (much like contact printing) is a simple, inexpensive process.

FIG. 2 illustrates a simplified arrangement for making the master hologram. As shown there, an energetic source such as a helium-neon laser 31 is positioned to direct the beam 32 therefrom onto a partially reflecting mirror 33. Half of the energy is reflected by mirror 33 onto another plane mirror 34, through a lens system 35 onto a photographic plate 36 at the appropriate angle $\theta_1$ with the normal thereto. The portion of the beam 32 passed through mirror 33 is reflected from a mirror 33' to a plane mirror 23' and through a lens system 35' onto the photographic plate 36 at an angle $\theta_2$ with the normal thereto.

The grating periodicity follows the known laws of interfering waves. Thus, with the two beams 36 and 36' intersecting the plate or film at angles $\theta_1$ and $\theta_2$, respectively, from the perpendicular to the plate, the grating period d is given by the following equation:

$$d + (\lambda s)/(\sin \theta_1 + \sin \theta_2)$$

where $\lambda s$ is the optical wavelength of the source. In the preferred arangement, $\theta_1$ and $\theta_2$ are selected to be equal so that $d$ equals $\lambda s/2 \sin \theta$.

If the angle $\theta$ is set precisely, the grating period can be related by a known constant to a known optical wavelength such as a standard lamp or laser. Thus, by appropriate selection of the angle $\theta$, the grating period can be an exact multiple or standard submultiple of a standard unit (inch, meter, etc.) thereby making a simple translation of the optical wavelength to useful units.

By way of example, if 6,328 A. helium-neon laser waves intersect at approximately 78°, the grating period can be set to be $20 \times 10^{-6}$ inches by the technique illustrated in FIG. 4. Such a grating used in the interferometer fringe counters of the present invention provide a method and means for measuring distance over a substantial range without the problems of a laser and wavelength-units conversion calculator of existing devices.

For purposes of illustration the element 37 has been described as a photographic plate. This can be a photosensitive emulsion, a photo-resist, photo-etched material or the like on a stable base. The record formed with the method and apparatus of FIG. 2 can be converted by bleaching from a density recording to a phase recording. Such a conversion increases the efficiency in the application to an interferometric fringe counter, but the phase shifts thus introduced are not acceptable in the standard moire fringe systems.

The method and apparatus of avoiding the critical manufacturing and mounting tolerances for achieving a reading directly in standard measuring units is illustrated in FIG. 3. As shown there, the grating 14 is first positioned with its lines substantially perpendicular to the direction of motion and the angle between the direction of motion and the normal to the lines varied to an appropriate angle to achieve the desired fringe spacing. With the movement of the grating 14 at different angles $\phi$, the counts per unit travel vary as the cosine of the angle $\phi$. Thus, final trimming of the instrument for direct reading in standard units is accomplished by selection of the appropriate angle $\phi$.

It has been found that the simplified interferometer of FIG. 1 requires relatively monochromatic light to produce high contrast fringes over a reasonable area. This is believed to result from the dispersion of the first order waves 17'' and 18'' which start at different distances from the detectors 22. The first order wave 18'' travels twice the distance from the hologram to the mirror (as waves 18 and 18') plus the hologram to detector distance (as wave 18'') after diffraction while the first order wave 17'' travels (as wave 17'') only from the hologram to the detector after diffraction. Therefore, the source 12 in the interferometric fringe counter apparatus of FIG. 1 should be relatively monochromatic light. An unstablized multimode laser can be utilized for this construction. White light can be utilized by inserting elaborate dispersion-compensation elements such as prisms or other gratings.

Another embodiment of the present invention as illustrated in f"4 permits operation with white light. As shown in FIG. 4, white light from a source is directed at an angle satisfying the Bragg criterion for a usable portion of the spectrum onto a pair of holograms 42 and 43, respectively, one stationary and the other movable in the "X" direction, closely spaced from one another by a distance "a" and with their lines arranged substantially parallel. A pair of detectors 44 is positioned on the opposite side of holograms 42 and 43 from the source 41 in the same relative position and distance "F" therefrom. Source light in the first order waves of the two holograms projects achromatic fringes in the plane of the detectors. The source 41, hologram 43, and detectors 44 are rigidly mounted with respect to one another and the hologram 42 is movable with respect thereto. Relative motion between the two holograms can be accomplished by mounting hologram 43 on a carriage movable relative to the other elements of the device or by mounting the source, hologram 43 and detectors 44 on a carriage movable relative to hologram 42. In the plane of the detector complementary to the plane of the source virtual image plane, achromatic (white light) fringes are projected.

The conditions for interference can be examined by requiring the phase of the light diffracted by the first grating ($\theta_1$) for position in the X direction and wavelength $\lambda$ to be equal to the phase of light diffracted by the second grating ($\theta_2$) for the same X and $\lambda$ or for the phase difference to be constant for all X and $\lambda$. With collimated light incident on grating 42 in FIG. 3 at an angle $\phi$ from the normal to the gratings, the phase of the incident light is equal to a constant, $2 \sin \phi$ times $X/\lambda$. The phase of light diffracted into order "m" is the sum of the incident phase and the phase retardation of the grating, $\pm 2 m (X/d)$ where $d$ is the period of the grating and is:

$$\theta_1 (X, \lambda) = X (2\pi\sin/\lambda \pm 2\pi m/d) \qquad (1)$$

If it is considered that only the $-1$ order satisfies the Bragg criterion, the phase of the output wave at the plane of the first grating is:

$$\theta(X, \lambda) = 2\pi X (\sin \phi/\lambda - 1/d) \qquad (2)$$

As the diffracted wave propagates to the second grating 43, an additional phase term is added to give:

$$\theta_1 (X, \lambda) = 2\pi X (\sin \phi/\lambda - 1/d) + 2\pi\delta/\lambda \qquad (3)$$

where $\delta$ is $a/\cos \phi$.

A portion of the original incident wave passes through the first grating and is partially diffracted by the second grating.

Using similar approaches to the above, we can show that: $\theta_2(X, \lambda) - \theta_1(X, \lambda) = 4\pi a \sin^2\phi)/(\lambda \cos \phi) \qquad (4)$ Since this phase difference is a constant over X, interference between the wave can occur over the entire output. It should be noted that the right hand term in the last-above equation represents a path length difference (in radians) that could exceed the coherent length of white light very easily. While not shown by the above theory, the dispersion of the grating greatly minimizes this problem, and achromatic interference is possible with substantial grating spacings. To get achromatic fringes from a system as shown in FIG. 3 using collimated white light requires an inversion of the collimation (Fourier transform) operating as shown in FIG. 4.

Referring to FIG. 4, there is shown a representation of the first and second gratings and light from a point light source collimated via a lens 45 and with the light received from the gratings focused onto the plane of the detectors via a lens 46.

It can be seen that lens 46 produces a pair of image spectra with brightness (but not phase) of any spectral component determined by grating location. Since light of exactly the same wavelength images to the same point when diffracted from either grating, this idealized system gives achromatic fringes for all spacings, a, permit usable energy from both gratings to pass through lens 46.

In practical application, collimated light is often not available due to space, energy and cost requirements. In accordance with the present invention, systems can be provided using non-collimated light.

Referring now to FIG. 5, there is shown a situation where two gratings are used with spherical expanding waves from a point or line source 47 at a finite distance, f, from the first grating.

The path difference for two rays 48 and 49 to the interference plane from the source 47 $[(l_1 + \delta) - l_2]$ is not constant over X in general, and the "zero fringe" condition is impossible if "a" is finite and the spacing between grating lines ($d_1$ for the first grating and $d_2$ for the second grating) is the same for both gratings.

In practice, a number of design compromises are possible. If "a" is far less than "f", the collimated example is approximately true and the useful low number of fringes appear in the achromatic interference plane.

However, in accordance with the present invention, an interference fringe counter can be provided using the point or line light source with different grating spacings. Setting the wavelength of the ray 48 ($l_1 + \delta$) equal to the wavelength of ray 49 ($l_2$) and solving for $d_2$ in terms of $d_1$, fix, and a yields:

$$d_2 = d_1 \frac{2}{1 + \sqrt{\frac{\frac{x^2}{f^2} + 1}{\frac{x^2}{f^2} + \frac{1+a^2}{1-a}}}} \quad (5)$$

This is an exact solution for the zero fringe condition, and, since $d_1$, $t$ and $a$ are normally constants, and adequate correction, if a is small, can be obtained by simple distortion of one of the laser wavefronts used in making the second hologram grating.

By way of example, for the illustrative embodiment given below, where the first grating contains 50,000 lines per inch, the second grating can be provided with an additional 40 to 90 lines per inch and thereby compensate for the problem of non-collimated light.

While the present invention has been described in sufficient detail to enable a person skilled in the art to practice the present invention, a further illustrative embodiment of an operative device employing the present invention is given below with reference to FIGS. 7-13.

Referring now to FIG. 7, there is shown a hologram interferometer 51 including a measuring unit 52 and an associated up-down counter 53 connected to the detectors of the interferometer for measuring precise distances. The instrument will measure precise distances from a first reference such as the top surface of a first member 54 to a second reference such as the top surface or plane (not shown or designated) utilizing any appropriate workpiece such as an analog probe 55 connected to an adaptor 56 mounted on the measuring column 57 of the measuring unit 52. In the illustrative embodiment, a dynamic measuring range determined by the length of movement of the movable grating is presettable over a large range by locking the adaptor 56 with the locking knob at any desired location along the length of the measurement column 57.

Figure 8:
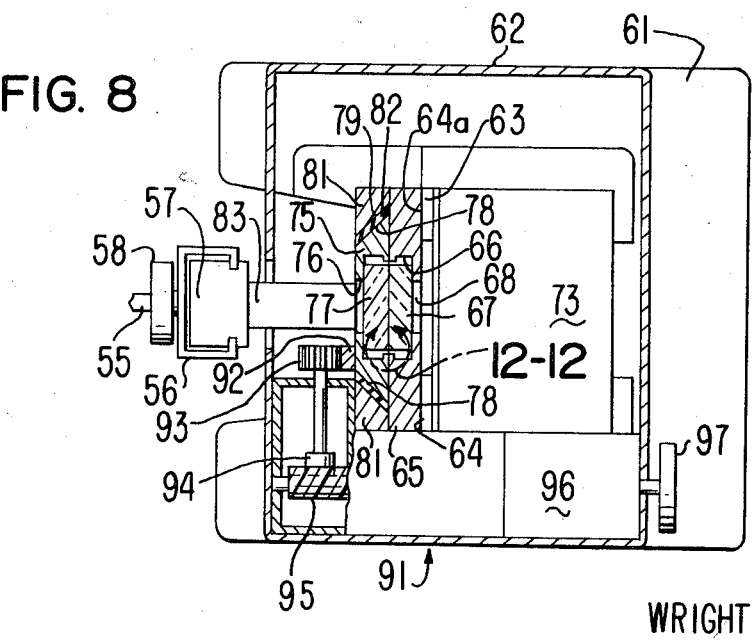
FIG. 8 is a cross sectional view of a portion of the structure shown in FIG. 9 taken along line 8—8 in the direction of the arrows.

The measuring unit 52, as better shown in FIGS. 8 and 9, includes a rigid base member 61 such as of cast metal onto which the fixed and movable hologram gratings are provided inside a cover member 62. The base member includes a pair of spaced apart mounting braces 63 projecting upwardly therefrom including a vertical side surface 64a for mounting the gratings and an angularly disposed surface 64b extending downwardly from the top of surface 63a for mounting the detectors. A fixed grating holder 65 is secured, such as by screws, to the vertical side surfaces 64a of the braces 63. The holder 65 includes an elongate slot 66 extending lengthwise centrally thereof for receiving and holding the fixed grating 67 in the manner to be described below with reference to FIG. 10. The grating is produced in the manner described above with reference to FIG. 2 and is in the form of a developed photographic emulsion on a glass substrate.

An aperture 68 is provided in the holder 65 centrally thereof for passing light from a line source 69 mounted on a bracket 71 on one side of the holder 65 through the gratings to the detectors 72 mounted on a printed circuit board 73 positioned via spacers 74 on the angled surface 64a. The line source can be a bulb with a straight tungsten wire filament and the source is mounted so that the line filament is parallel with the lines of the gratings.

The movable grating holder 75 which is provided with an elongate slot 76 for receiving the movable grating 77 similar to but longer than the fixed grating 67 is slidably supported close to but spaced from the fixed grating via strips of smooth sliding surface material 87, such as Teflon tape (see FIG. 12), provided adjacent the outer surface of one of the gratings. The gratings are held together by means of a pair of 45° angle beveled edge surfaces along the outside edges of the movable holder 75 which are guided by mating beveled edge surfaces 79 on holding plate members 81 secured, such as by screws, to the fixed grating holder 65. A smooth sliding surface member 82, such as of Teflon, is provided on the beveled surfaces 79 each holding plate 81 to permit smooth sliding movement of the movable grating holder 75 with respect to the fixed grating holder 65.

The measurement column 57 is secured to the movable grating holder 75 and movable therewith by means of a pair of spaced apart support posts 83 secured, such as by screws, to both the movable grating holder 75 and the measurement column 57.

The fixed and movable gratings are resiliently supported in their respective holders and alignable with one another in the manner illustrated in FIGS. 10 and 11. Each of the holders is provided at diagonally opposite corners of the longitudinal slot in the region where the grating is mounted with alignment screws 84 which include eccentric pins 85 projecting into the slots. A corrugated leaf spring 86 is positioned in the holder slot on the opposite side of the grating from the eccentric pins for biasing the grating against the eccentric pin. Rotation of the respective alignment screws controls the alignment of the grating in the slot and permits alignment of the lines of the two gratings for establishing the desired interference fringes.

Each of the gratings is supported longitudinally in its mounting holder with a support block 89 at each end of the elongate slot with each block having a pin 90 projecting therefrom against the grating. The pin end is spring biased for resiliently holding the grating longitudinally of the grating holder.

Relative motion between the fixed grating holder 65 and the movable grating holder 75 is provided by a drive mechanism 91 including a rack 92 secured to the outside surface of the movable grating holder 75 and a pinion 93 supported on the base 61 and connected via a worm wheel 94 and worm 95 through a fine and coarse index drive mechanism to a control knob 97 projecting outwardly from the housing 62.

In the embodiment of the measuring unit 52 described and illustrated with reference to FIGS. 7–12, four detectors 72, such as photo diode detectors 72a, 72b, 72c and 72d, (see FIG. 13) are provided and connected in quadrature for producing a numerical count via the up-down counter 53. As shown in FIG. 13, the photo diode detectors are positioned in a series with adjacent detectors spaced apart by 90° in the phase of the fringe pattern produced by the light source and holographic gratings. Pairs of these detectors 72a and 72c and 72b and 72d are connected to differential amplifiers 101 and 102, respectively, the output signals of which are passed respectively through Schmidt triggers 103 and 104 to the up-down counter 53 which includes a Nixie tube count display 100.

Each pair of detectors will produce two counts per period of the fringe pattern and the quadrature connection of the pairs of detectors provides a reference for stop and reversal of the pattern movement for producing both up and down counting. A reference set circuit 107 having both thumb wheel switches 108 and reference set button 109 on the face of the counter is provided for zeroing the counter or inserting a reference number into the counter.

For operation of the instrument, the type of analog probe desired for the particular measurement is attached to the adaptor 56 and the adaptor 56 is moved along the measurement column 57 until the probe 55 is within the dynamic measurement range of the instrument at which point the adaptor 56 is locked to the column 57 with the locking knob 58. The control knob 97 is moved until the probe 55 is resting on the reference surface. Then, the meter on the up-down counter 53 is set to zero for a distance measurement or a reference measurement number is set on the thumb wheel switches 108 of the reference set counter and entered into the counter indicator of the up-down counter 53 by depressing the reference set button 109. As the operator moves the control knob 97, the fringes of the fringe pattern move past the detectors 72, are counted and the counter reflects the distance moved, as well as the direction. Thus, the operator can move the probe to zero reading, can move the probe to a desired measurement reading or can move the probe a desired overall distance measurement from another surface.

An instrument constructed as shown in FIGS. 7–13 has been provided with holographic gradings having 50,000 lines per inch providing one millionth inch per inch accuracy with detectors in quadrature measuring two counts per grating period.

What is claimed is:

1. An interferometer comprising:
   a fourier-transform hologram formed from the interference pattern of two energetic beams,
   an energetic source positioned on one side of the said hologram to direct an energetic beam onto said hologram,
   means on the other side of said hologram from said source for redirecting zero order mode source energy passed by said hologram back to said hologram for passage therethrough and separation of first order mode energy portion thereof,
   means on said other side of said hologram for redirecting first order mode source energy passed by said hologram back to said hologram for passage therethough and formation of an interference pattern with said first order mode energy portion of said redirected zero order mode energy,
   means for providing relative movement between said hologram and said source for movement of said interference pattern, and
   means for detecting said interference pattern and counting the fringes of said pattern during said relative movement.

2. An interferometric fringe counter, comprising:
   a diffraction grating,
   an energetic source positioned to direct an energy beam to said grating to form an undiffracted zero order beam and at least one diffracted order beam.
   means positioned in the path of said undiffracted zero order beam for redirecting said zero order beam to said grating, thereby diffracting a portion of said zero order beam into a second diffracted order beam,
   means for redirecting said at least one diffracted order beam to combine with said second diffracted order beam, whereby interference fringes are formed in the combined diffracted order beams,
   means for providing relative movement between said source and said grating in a direction substantially perpendicular to the fringes of said interference pattern,
   means for detecting said interference fringes; and
   means for counting said fringes as a measure of said relative movement.

3. An interferometric fringe counter of claim 2 wherein said grating is a transmission type grating, said energetic source and said detecting means are positioned on one side of the grating, and said redirecting means are positioned on an opposite side of the grating.

4. An interferometer, comprising:
   means for generating an electromagnetic energy illuminating beam having spatial coherence in at least one direction,
   a pair of closely-spaced parallel line gratings positioned in the path of said illuminating beam, said gratings having their lines substantially parallel to each other but perpendicular to said one direction,
   a first grating thereby passing a portion of said energy directly through as a zero order beam and diffracting a portion into a first or higher order beam, a second grating diffracting a portion of said zero order beam into a first or higher order beam propagating in substantially the same direction as said beam diffracted by the first grating, thereby generating fringes of interference across said diffracted beams, means for providing relative motion between said pair of gratings, and means fixed with respect to said illuminating beam in the path of said first or higher order diffracted beams for detecting movement of said fringes as relative motion is applied to the pair of gratings.

5. The interferometer of claim 4 wherein each of said pair of gratings is a holographic grating formed from an interference of two coherent energy beams.

6. An interferometer, comprising:

means for generating a polychromatic electromagnetic energy illuminating beam having spatial coherence in at least one direction, a pair of closely spaced parallel line gratings positioned in the path of said illuminating beam, said gratings having their lines substantially parallel to each other but perpendicular to said one direction, a first grating thereby passing a portion of said energy through as a zero order beam and diffracting a portion into a first or higher order beam, a second grating diffracting a portion of said zero order beam into a first or higher order beam propagating in substantially the same direction as said beam diffracted by the first grating, thereby generating sharp achromatic fringes of interference in a plane through said diffracted beams, means for providing relative motion between said pair of gratings, and means fixed with respect to said illuminating beam in the path of said first or higher order diffracted beams at said achromatic fringe plane for detecting movement of said fringes as relative motion is applied to the pair of gratings.

7. The interferometer of claim 6 wherein the period of each of the pair of gratings is substantially an exact multiple or submultiple of a standard measuring unit.

* * * * *